US012670288B2

(12) United States Patent (10) Patent No.: US 12,670,288 B2
Song et al. (45) Date of Patent: Jun. 30, 2026

(54) VIRTUAL KEYS FOR COLUMN DATASET ACCESS MANAGEMENT

(71) Applicant: Uber Technologies, Inc., San Francisco, CA (US)

(72) Inventors: Huicheng Song, San Francisco, CA (US); Xinli Shang, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 99 days.

(21) Appl. No.: 18/369,942

(22) Filed: Sep. 19, 2023

(65) Prior Publication Data

US 2025/0094618 A1     Mar. 20, 2025

(51) Int. Cl.
| | |
|---|---|
| *H04L 29/06* | (2006.01) |
| *G06F 21/60* | (2013.01) |
| *G06F 21/62* | (2013.01) |
| *H04L 9/32* | (2006.01) |

(52) U.S. Cl.
CPC ........ *G06F 21/6227* (2013.01); *G06F 21/602* (2013.01); *H04L 9/3297* (2013.01)

(58) Field of Classification Search
None
See application file for complete search history.

(56) References Cited

U.S. PATENT DOCUMENTS

| | | | | |
|---|---|---|---|---|
| 7,269,729 | B2 * | 9/2007 | He | H04L 9/0894 |
| | | | | 380/279 |
| 8,745,384 | B2 | 6/2014 | Persaud | |

| | | | | |
|---|---|---|---|---|
| 8,813,247 | B1 * | 8/2014 | Alten | H04L 9/0637 |
| | | | | 726/28 |
| 9,959,280 | B1 | 5/2018 | Whitehead | |
| 10,025,873 | B2 * | 7/2018 | Jackson | G06F 16/972 |
| 10,033,703 | B1 | 7/2018 | Sharifi Mehr | |
| 10,061,717 | B1 * | 8/2018 | Yang | H04L 9/14 |
| 10,615,969 | B1 * | 4/2020 | Griffin | H04L 9/0897 |
| 10,615,970 | B1 * | 4/2020 | Griffin | H04L 9/0822 |
| 2002/0038296 | A1 | 3/2002 | Margolus | |
| 2003/0123671 | A1 * | 7/2003 | He | H04L 9/0825 |
| | | | | 713/168 |
| 2012/0323750 | A1 * | 12/2012 | Sivaramakrishnan | H04L 9/14 |
| | | | | 713/165 |
| 2013/0047230 | A1 * | 2/2013 | Krishnan | G06F 21/6218 |
| | | | | 726/7 |

(Continued)

*Primary Examiner* — Maung T Lwin

(74) *Attorney, Agent, or Firm* — Mahamedi IP Law LLP

(57)     ABSTRACT

A key management system can store, in a tag repository, information associating policy tags with column datasets. The system can receive a client request for an encrypted encryption key (EEK) to access a column dataset, where the client request includes a column name for the column dataset. Based on the client request, the system can perform a lookup in the tag repository to identify one or more tags associated with the column dataset and determine whether the client device is authorized to access the column dataset. Based on determining that the client device is authorized to access the column dataset, the system can generate an original encryption key, and generate the EEK using a shared master key, the original encryption key, and at least the column name for the column dataset. The system may then provide the EEK to the client device over the one or more networks.

20 Claims, 6 Drawing Sheets

(56)        References Cited

U.S. PATENT DOCUMENTS

| | | | |
|---|---|---|---|
| 2015/0074744 A1 | 3/2015 | Mclean | |
| 2015/0318987 A1 | 11/2015 | Kremp | |
| 2016/0094585 A1 | 3/2016 | Shahbazian | |
| 2016/0217294 A1 | 7/2016 | Hornquist Astrand | |
| 2017/0286696 A1 | 10/2017 | Shetty | |
| 2020/0099515 A1 | 3/2020 | Hopkins | |
| 2020/0374111 A1* | 11/2020 | Crowley | H04L 9/14 |
| 2022/0067206 A1* | 3/2022 | Lindsay | G06F 21/6209 |
| 2023/0144072 A1* | 5/2023 | Shemer | H04L 9/0822 |
| | | | 713/193 |
| 2023/0205896 A1* | 6/2023 | Bridges | G06F 21/6218 |
| | | | 713/193 |
| 2024/0143810 A1* | 5/2024 | Brenner | H04L 63/101 |

* cited by examiner

Receive Client Request To Access Column Dataset
300

Based On Client Request Perform Lookup In Tag Repository For Tag(s) Associated With Column Dataset
305

Client Authorized?
310

No → Deny Request
315

Yes

Generate EEK For User
320

Provide EEK To Client To Enable Access To Column Dataset
325

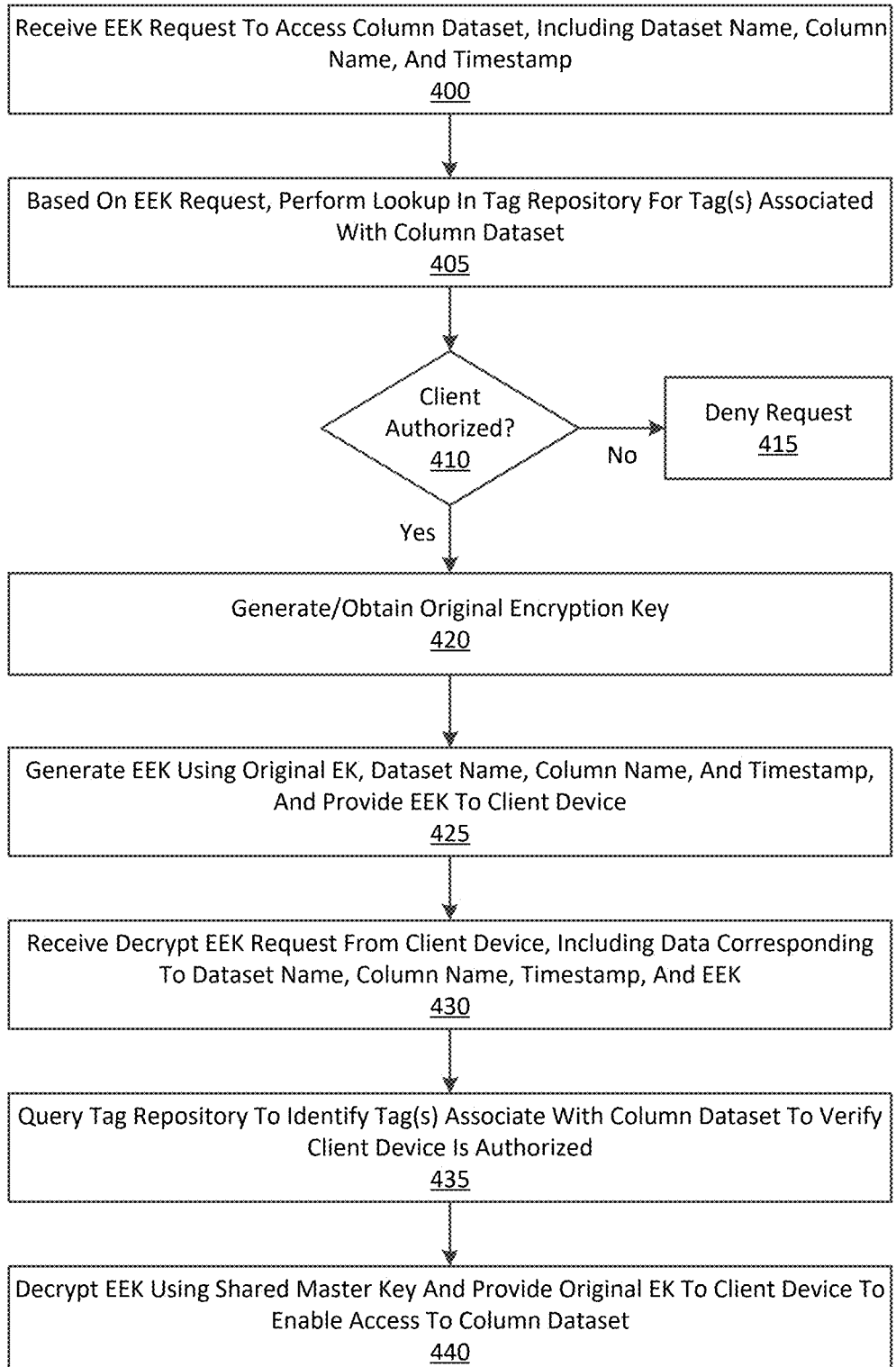

Receive EEK Request To Access Column Dataset, Including Dataset Name, Column Name, And Timestamp
400

Based On EEK Request, Perform Lookup In Tag Repository For Tag(s) Associated With Column Dataset
405

Client Authorized?
410

Deny Request
415

No

Yes

Generate/Obtain Original Encryption Key
420

Generate EEK Using Original EK, Dataset Name, Column Name, And Timestamp, And Provide EEK To Client Device
425

Receive Decrypt EEK Request From Client Device, Including Data Corresponding To Dataset Name, Column Name, Timestamp, And EEK
430

Query Tag Repository To Identify Tag(s) Associate With Column Dataset To Verify Client Device Is Authorized
435

Decrypt EEK Using Shared Master Key And Provide Original EK To Client Device To Enable Access To Column Dataset
440

FIG. 4

VIRTUAL KEYS FOR COLUMN DATASET ACCESS MANAGEMENT

BACKGROUND

Column level encryption is typically used to enable flexibility in deciding which datasets should and should not be encrypted. Typically, column level encryption requires the storage of separate encryption keys for each column dataset.

BRIEF DESCRIPTION OF THE DRAWINGS

The disclosure herein is illustrated by way of example, and not by way of limitation, in the figures of the accompanying drawings in which like reference numerals refer to similar elements, and in which:

FIGS. 3 and 4 are a flow charts describing methods of authorizing a column access request, according to examples described herein;

DETAILED DESCRIPTION

Figure 1:
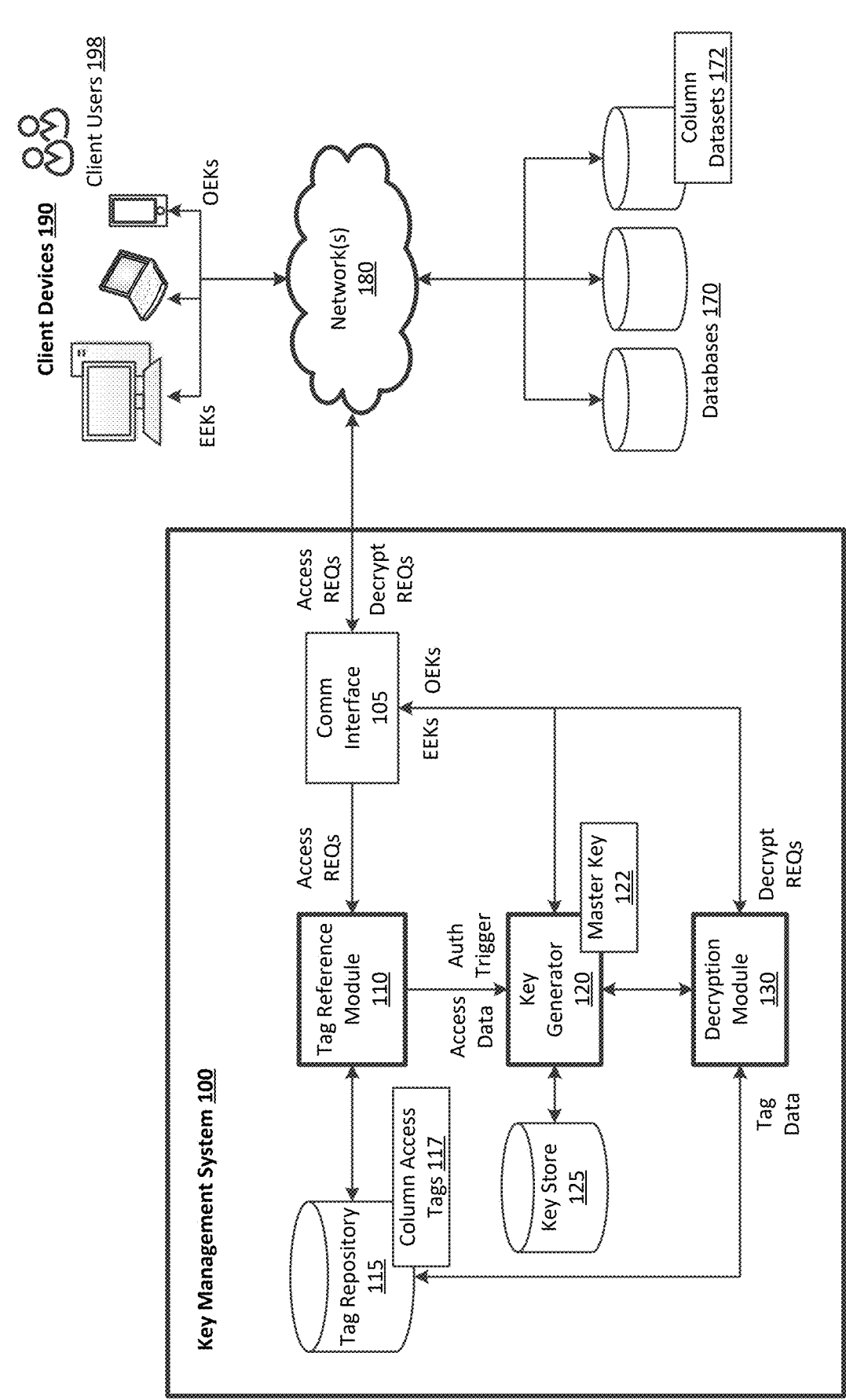
FIG. 1 is a block diagram illustrating an example key management system, in accordance with examples described herein.

Column-level access control for datasets involves the encryption of columns with keys based on policy tags. A policy tag (or simply "tag") utilized to encrypt data in a column of a data table can govern which users may access the dataset in the column and may be further utilized to encrypt the data stored in a column with a key associated with the tagged column. A tag may further govern data retention, in which the data in the column is automatically deleted after a period of time indicated by or otherwise associated with the tag. Accordingly, a tag can comprise a predefined set of access policies managed by a Key Management Service (KMS) in a column-based storage format where access control is configured by tagging at WRITE time.

In accordance with this implementation, a client access request includes a request for an encrypted encryption key (EEK) using the tag associated with the column. The KMS system performs a check to determine whether the client is authorized to access the column based on the tag. If so, the KMS system generates a random encryption key, encrypts the random encryption key with a physical master key, and returns the result to the client device (which can include the EEK, master key name, and an initialization vector). The client may then send a decryption request to the KMS system that includes the tag, timestamp, initialization vector, and EEK. The KMS system performs a check to determine whether the client has permission to the tag, and if so, the KMS system decrypts the EEK with the master key and returns the plaintext encryption key to enable access to the column.

One particular problem identified with the current implementation is the need to rewrite all existing files in a particular column when a tag change occurs for the dataset corresponding to the particular column. Furthermore, certain datasets may be associated with multiple tags, and are encrypted with combined keys based on the multiple tags. When tag changes occur for these datasets, exponential rewrite operations are needed with potentially unbounded key growth, which requires significant compute resources to perform key management (e.g., in runtime, backup, synchronization, etc.). Tag changes may also result in access authorization errors where, for example, clients that should have access based on one tag are denied access based on a change to another tag used to encrypt the column. Still further, for time-based deletion of data, time-based keys are used that need to be periodically preloaded, sometimes years in advance.

In accordance with examples described herein, a KMS system can virtualize key creation for columns by decoupling encryption and tagging, and facilitate fine-grained access control. Instead of using the tag for a particular column for encryption, the KMS system can encrypt the column with an original key based on the dataset name, column name, and/or timestamp for the column. The KMS system can include a policy tag repository (or "tag repository") where the KMS system looks up tags associated with particular columns at READ time when a client access request is received. By virtualizing key creation, tagging changes do not require re-encryption since encryption is performed using a shared master key involving no tags. Furthermore, multiple tags for columns do not require multiple keys, and there is no longer a need to preload keys for tags or continue adding keys as time progresses.

In some examples, to access a column dataset, a client device can transmit a client request for an encrypted encryption key (EEK) without any tag information (e.g., a request based the dataset name for a data table that includes the column dataset, a column name for the column dataset, and timestamp). The KMS system receives the client request and then references the tag repository to determine whether the client has permission to access the column based on one or more tags associated with the column as indicated in the tag repository. If so, the KMS system generates a random encryption key, and then generates the EEK for accessing the column from the combination of the random encryption key, dataset name, column name, and timestamp with a shared physical master key. The result is returned to the client device as a combination of the EEK and master key name with, for example, the dataset name, column name, timestamp, and initialization vector.

The client device then sends a decryption request using the EEK, master key name with information for the dataset name, column name, and timestamp, and the initialization vector. The KMS system can then look up the dataset name and column name to find the associated tag in the tag repository to determine whether the client has permission to the tag. If so, the KMS system (i) decrypts the EEK with the shared physical master key into the encryption key, dataset name, column name, and timestamp, (ii) performs an integrity check to verify that the decrypted dataset name, column name, and timestamp matches the dataset name, column name, and timestamp as provided in the client request (e.g., for spoofing prevention), and (iii) returns the original encryption key generated at request time.

As such, the key name is virtualized with the dataset, column, and timestamp fields, and the encrypted data will include these fields in addition to the encryption key. In enforcing data retention to allow for key expiration, it is contemplated that the shared physical master key cannot be deleted. According to examples provided herein, the KMS system can use time-based physical keys and prevent the sharing of these physical keys with differing times-to-live (TTLs). In such an embodiment, the KMS system can use a retention key with a key name based on the tag(s) associated with the column (and timestamp). When tag changes occur in this embodiment, the urgency to rewrite is relaxed, since the system has until the physical key TTL to rewrite the column dataset as opposed to requiring an immediate rewrite, thereby reducing the risk of access authorization errors.

Among other benefits, the examples described herein achieve a technical effect of virtualizing encryption keys for column level access, which significantly reduces the need to rewrite datasets in response to tag changes, and further significantly decreases the necessary resources for key management. Additional technical improvements involve the significant reduction or elimination of access authorization errors, as provided herein.

As used herein, a computing device refers to devices corresponding to desktop computers, cellular devices or smartphones, personal digital assistants (PDAs), laptop computers, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, virtual reality (VR) or augmented reality (AR) devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer programs, or a computer usable carrier medium capable of carrying such a program.

System Description

FIG. 1 is a block diagram illustrating an example key management system 100, in accordance with examples described herein. As provided herein, the key management system 100 can be implemented on a computing system comprising one or more servers that include a communication interface 105 to communicate with client devices 190 over one or more networks 180. The client devices 190 of various client users 198 can include personal computers, tablet computers, laptops, smartphones, headset computing devices, and the like, and can execute one or more applications in which backend computing systems provide one or more services, collect and store data (e.g., generally in databases 170 or data tables organized in a column-based file storage format). Client users 198 can comprise web or application users and/or administrators of application services.

Based on the nature of the stored data in individual columns (i.e., column datasets 172), the data may be encrypted using information unique to the column dataset 172. As provided herein, each column dataset 172 can be encrypted using a key (e.g., a shared master key 122 managed by a key generator 120 of the key management system 100) based on at least the column name for the column dataset 172. Additional information used to encrypt the column dataset 172 can include, for example, the dataset name (e.g., for the data table that includes the column dataset 172) and timestamp correspond to when the data was obtained and/or stored. Accordingly, the information included in an access request from a client device 190 can include the dataset name, column name, and timestamp of the column dataset 172 requested to be accessed.

In accordance with examples described herein, the key management system 100 can include a tag repository 115 that stores column access tags 117 (e.g., policy tags) that regulate access to specified column datasets 172 in a column level access control system (e.g., a PARQUET file format). Accordingly, instead of encrypting column datasets 172 using the policy tags themselves at WRITE time, the key management system 100 stores the policy tags in a separate tag repository 115 that is referenced at READ time upon receiving client access requests. In separating tagging from encryption, the key management system 100 can update tag changes in the tag repository 115 without having to rewrite and re-encrypt the column dataset 172. In further examples, the key management system 100 can implement key versioning to indicate the new key name encoding, and include dataset name and column name information in the access request instead of information identifying the policy tag.

In certain implementations, a client user 198 may provide input to access a particular column dataset 172 in one of the databases 170. The column datasets 172 can represent web and/or application utilization data, such as messaging data, purchase data, and any historical data corresponding to application services used by the client user 198 (e.g., visual and/or audio content history, rideshare services, search history, input information, location and/or other sensor data, and the like), payment information (e.g., credit card numbers, debit card numbers, account information, biometric information, government identifications, social security numbers, etc.), IP address, home address, and the like. Upon receiving an access request from a particular client device 190, a tag reference module 110 of the key management system 100 can identify information of the client user 198 in the access request, such as a user identifier, a particular dataset housed in the databases 170, and a column name of a column dataset 172 that stores the requested data. In further examples, the tag reference module 110 can further reference a timestamp in the access request that can identify a specified column dataset 172.

In various implementations, the access request from the client device 190 can comprise a request for the key management system 100 to generate an encrypted encryption key (EEK) to enable access to the column dataset 172. For example, the access request can comprise a request for an EEK by the master key name without any tags, which can include information identifying the dataset name, column name, and timestamp. The tag reference module 110 can use this information to perform a lookup in the tag repository 115 for the column access tag(s) 117 corresponding to the requested column dataset 172 to determine whether the client user 198 has permission. If the client user 198 has permission to access the column dataset 172, then tag reference module 110 can provide an authorization trigger to the key generator 120, with the relevant information corresponding to the column dataset 172 (e.g., dataset name, column name, timestamp).

According to examples, the key generator 120 can generate or otherwise obtain an original encryption key (e.g., a random encryption key from a key store 125 that corresponds to the column dataset 172), and then encrypt the original key with the shared master key 122. As an example, the original key can reference the dataset, column, and timestamp for the column dataset 172 requested to be accessed by the client user 198, and the encryption of the original key by the key generator 120 with the shared master key 122 can comprise the EEK. The key generator 120 can then transmit the EEK to the client device 190 of the client user 198.

To access the column dataset 172, the client device 190 can transmit a decryption request including information identifying the dataset name, column name, timestamp, and EEK to the key management system 100. The communication interface 105 can forward the decryption request to a decryption module 130 of the key management system 100, which can perform a lookup in the tag repository 115 to verify whether the client user 198 has permission to access the column dataset 172. Specifically, the decryption module 130 can utilize the dataset name, column name, and timestamp to identify one more column access tags 117 for the column dataset 172, and determine whether the client user 198 is included in a class or category of users corresponding to the column access tag(s) 117 that have permission to access the column dataset 172.

In various examples, upon determining that the client user 198 has permission to access the column dataset 172, the decryption module 130 can utilize the shared master key 122 to decrypt the EEK to yield the original key, the dataset, column, and timestamp. In certain implementations, to prevent spoofing attempts, the decryption module 130 can further verify that the decrypted dataset, column, and timestamp matches the referenced information in the decryption request (e.g., the dataset name, column name, and timestamp). Upon decrypting the EEK, the decryption module may return the original key (e.g., the random encryption key from the key store 125) to the client device 190 to enable access to the column dataset 172.

In accordance with the above implementations, the shared physical master key 122 may not be deleted. To enforce data retention and allow for key expiration, the key management system 100 can use time-based physical keys and prevent the sharing of these physical keys with differing times-to-live (TTLs). In such an embodiment, the key management system 100 can use retention keys with key names based on the tag(s) associated with the column name and timestamp (e.g., as identified in the tag repository 115). When tag changes occur in this embodiment, the urgency to rewrite is relaxed, since the key management system 100 can wait until the physical key TTL to rewrite the column dataset as opposed to requiring an immediate rewrite, thereby reducing the risk of access authorization errors. As such, the shared master key 122 can comprise a time-based physical key that is associated with a TTL to facilitate data retention enforcement. In such examples, the TTL of the shared master key 122 can correspond to the timestamp of the column dataset 172.

When a tag change occurs for a particular column dataset 172 (e.g., based on a user or administrator input), the tag reference module 110 can configure the one or more tags associated with the column dataset 172 to implement the tag change in the tag repository 115. Accordingly, a rewrite of the column dataset 172 itself is not required.

Timing Diagram

Figure 2:
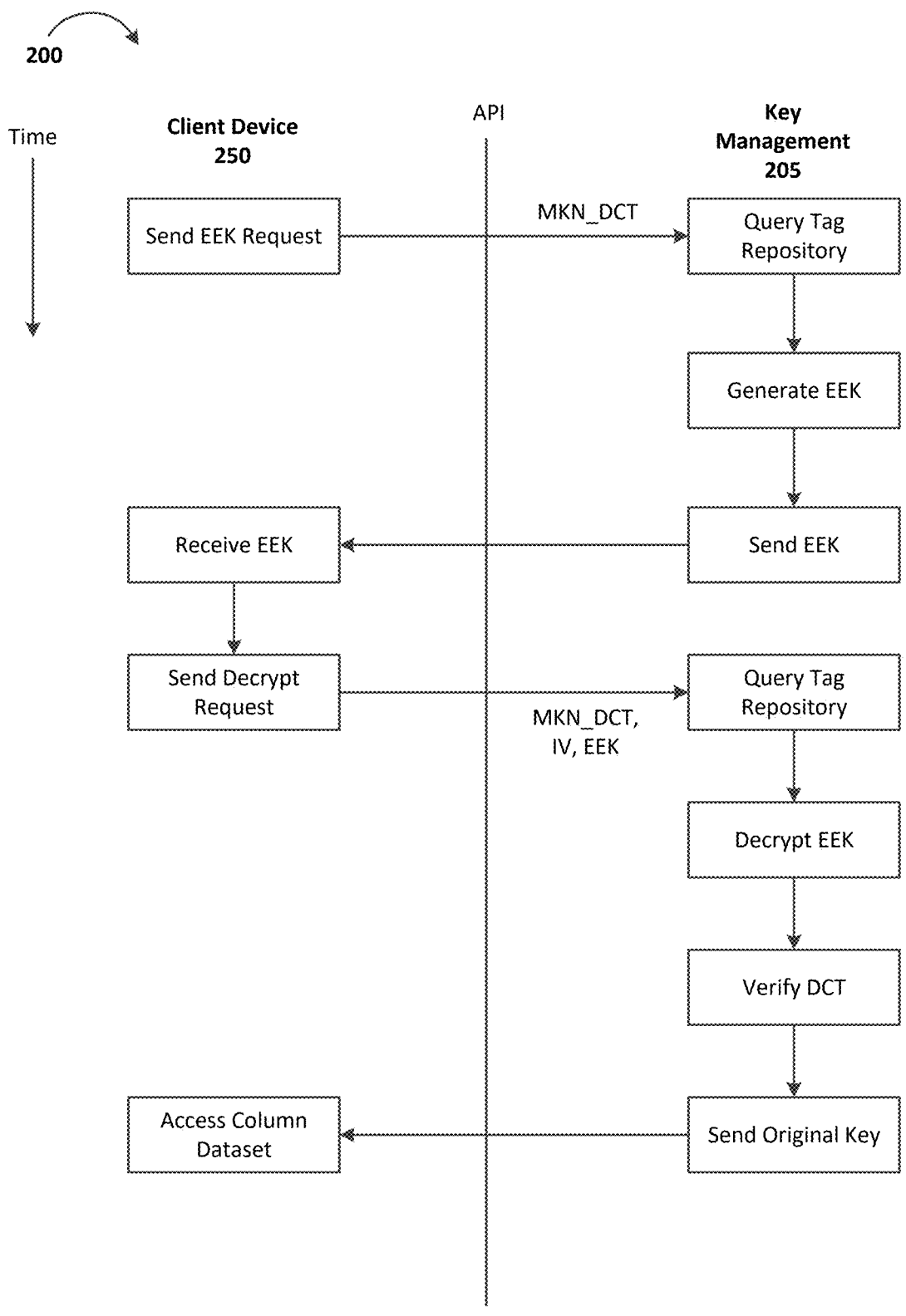
FIG. 2 is a timing diagram illustrating interactions between a client device and key management system, according to examples described herein.

FIG. 2 is a timing diagram 200 illustrating interactions between a client device 250 and key management system 205, according to examples described herein. The timing diagram 200 shown in FIG. 2 can correspond to the interactions between a client device 190 and key management system 100 as shown and described with respect to FIG. 1. Referring to FIG. 2, to access a column dataset, a client device 250 can send an EEK request to key management system 205. The communications between the client device 250 and the key management system 205 can occur by way of an application programming interface (API) (e.g., a representational state transfer (REST) API) over one or more networks.

In various examples, the EEK request can include the master key name (MKN) and reference the dataset, column, and timestamp (DCT) of the column dataset 172 that the client device 250 requests to access. As such, no tag information is provided in the request. The key management system 205 may then query the tag repository 115 to determine whether the client device 250 has permission to access the column dataset 172. Upon verifying that the client device 205 has access to the column dataset 172, the key management system 205 can generate the EEK using the shared master key 122, an original key (e.g., retrieved from a key store 125 and/or generated randomly), the dataset, column, and timestamp corresponding to the column dataset 172, and return the EEK to the client device 250.

The client device 250 can receive the EEK, which can comprise the encrypted original key with encoded dataset, column, and timestamp. The client device 250 can then send a decryption request to the key management system 205, which can include an initialization vector (IV), the master key name (MKN), dataset, column, and timestamp (DCT), and the EEK. The key management system 205 can again query the tag repository 115 to determine whether the client device 250 has permission to access the column dataset 172, and then decrypt the EEK using the shared master key 122. In certain example, the key management system 205 can further perform an integrity check to verify that the decrypted dataset name, column name, and timestamp matches the dataset name, column name, and timestamp as provided in the client request (e.g., for spoofing prevention).

Upon decrypting the EEK and/or performing the integrity check, the key management system 205 can send the original key back to the client device 250. The client device 250 may then utilize the original key to access the column dataset 172.

Methodology

Figure 3:
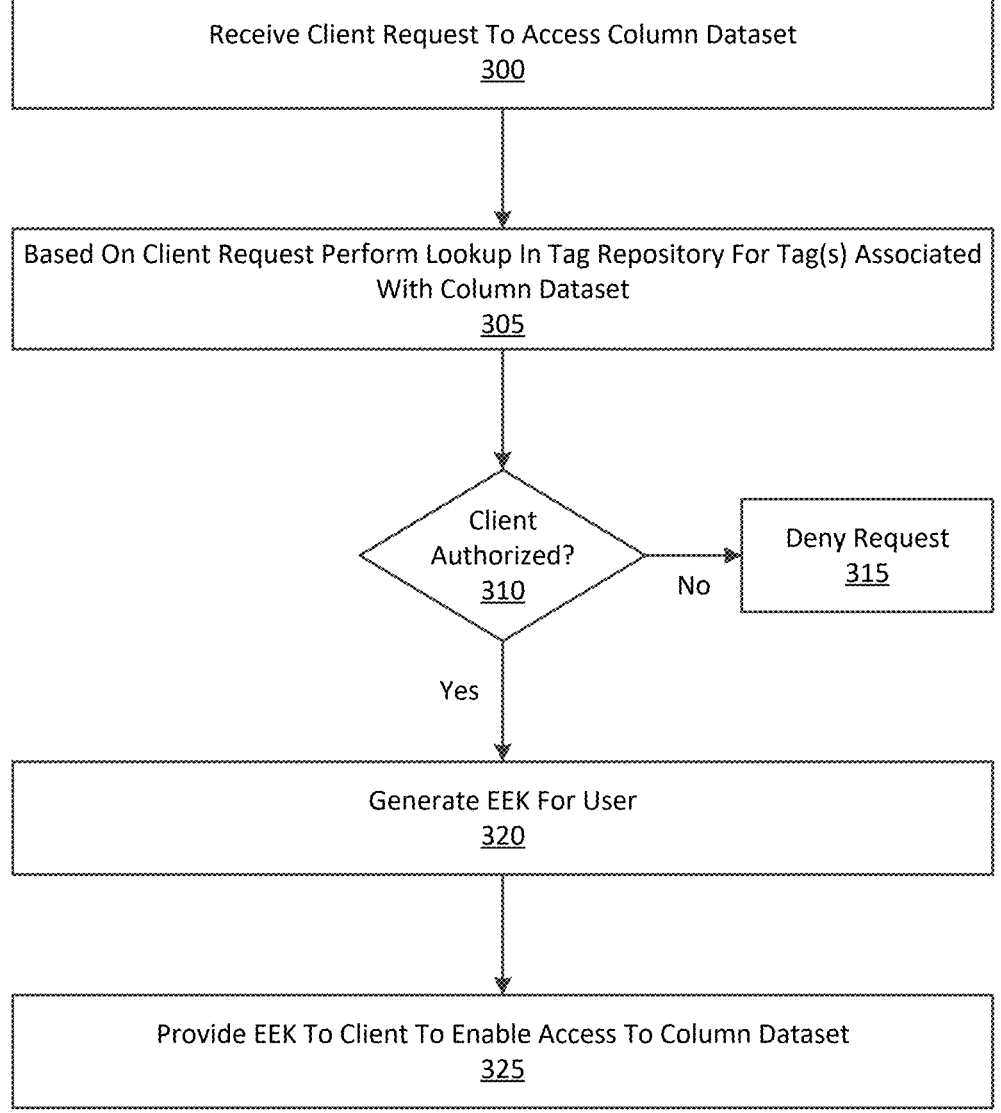

FIGS. 3 and 4 are a flow charts describing methods of authorizing a column access request, according to examples described herein. In the below discussion of FIGS. 3 and 4, reference may be made to reference characters representing various features as shown and described with respect to FIGS. 1 and 2. Furthermore, the processes described in connection with FIGS. 3 and 4 may be performed by an example key management system 100, 205 as shown and described with respect to FIGS. 1 and 2.

Referring to FIG. 3, the key management system 100 can receive a client request to access a column dataset 172 from a client device 190 (300). In various implementations, the client request can reference the master key 122 and can include information corresponding to the column dataset 172, such as the dataset in which the column dataset 172 in include, the column name of the column dataset 172, and the timestamp of the column dataset 172. Based on the information provided with the client request, the key management system 100 can perform a lookup in a tag repository 115 for one or more column access tags 117 associated with the column dataset 172 (305). Based on the access tags 117, the key management system can determine whether the client device 190 has permission to access the column dataset 172 (310). If not, the key management system 100 can deny the client request (315).

However, if the client device 190 does have permission, the key management system 100 can generate an EEK for the client user 198 of the client device 190 (320). As provided herein, the EEK can comprise an encrypted encryption key associated with the column dataset 172 (e.g., an original key encrypted with the shared master key 122), where the original key references the dataset name, column name, and timestamp of the column dataset 172. In various examples, the key management system 100 may then provide the EEK to the client device 190 to enable access to the column dataset 172 (325).

FIG. 4 is another flow chart describing an example method of implementing column-level access control for authorizing column access requests, in accordance with examples described herein. Referring to FIG. 4, the key management system 100 can receive an EEK request to access a column dataset 172 from a client device 190 of a client user 198, where the EEK request includes the dataset name, column name, and timestamp for the column dataset 172 (400). Based on the EEK request, the key management system 100 can perform a lookup in the tag repository 115 for one or more column access tags 117 associated with the column dataset 172 (405). The key management system 100 may then determine whether the client user 198 is authorized to access the column dataset 172 based on the tag(s) 117 (410). If not, the key management system 100 can deny the EEK request (415).

However, if the client user 198 is authorized to access the column dataset 172, the key management system 100 can generate or obtain an original encryption key associated with the column dataset 172 (420). The key management system 100 may then generate the EEK using the original encryption key, dataset name, column name, and timestamp associated with the column dataset 172 and provide the EEK to the client device 190 of the client user 198 (425). In various examples, the key management system 100 can then receive a decryption request from the client device 190, which can include the EEK and data corresponding to the dataset name, column name, timestamp (430).

In various examples, the key management system 100 can query the tag repository 115 again to identify the column access tags 117 associated with the column dataset 172 to verify that the client user 198 is authorized to access the column dataset 172 (435). In some implementations, the key management system 100 can further verify that the data referencing dataset name, column name, and timestamp in the decryption request matches the dataset, column, and timestamp of the column dataset 172 (e.g., to prevent spoofing). Upon determining that the client user 198 is authorized, the key management system 100 can decrypt the EEK using the shared master key 122 and provide the original encryption key to the client device 190 of the client user 198 to enable access to the column dataset (440).

As described herein, the shared master key 122 can comprise a time-based physical key that is associated with a TTL to facilitate data retention enforcement. In such examples, the TTL of the shared master key 122 can correspond to the timestamp of the column dataset 172. As further provided herein, policy tag changes can be performed in the tag repository 115 without requiring re-encryption or a rewrite of the column dataset 172.

Hardware Diagrams

Figure 5:
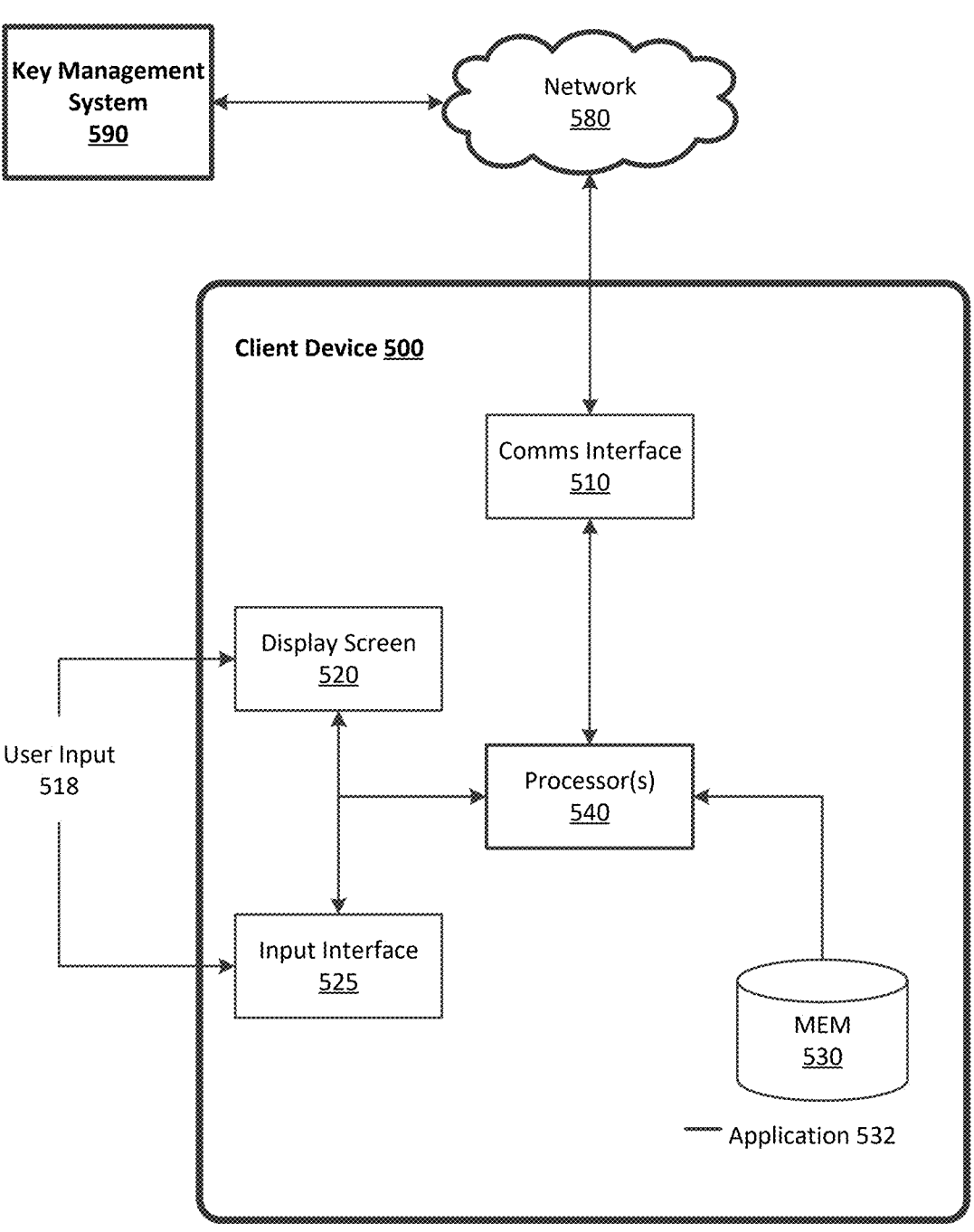
FIG. 5 is a block diagram illustrating an example client device, according to examples described herein.

FIG. 5 is a block diagram illustrating an example client device 500 in communication with a key management system 590 over one or more networks 580, as described herein. In many implementations, the client device 500 can comprise a computing device, such as a smartphone, tablet computer, laptop computer, VR or AR headset device, personal computer, and the like. In some examples, the client device 500 can include a local memory 530 that stores an application 532 that enables a set of application services. In various examples, the use of the application 532 can result in various data being transmitted and stored in one or more databases, which can require data encryption. As provided herein, any sensitive information can be encrypted in a column dataset, which can include private messages, personal information, payment information, and any other data associated with the client user's engagement with the application 532.

In various examples, the client device 500 can include one or more processors 540 that execute the application 532 to enable the one or more application services. The client user can provide user input 518 to a display screen 520 and/or input interface 525 (e.g., a mouse and keyboard) of the client device 500 to interact with the executing application 532. As provided herein, in order to access encrypted data, the client device 500 communicates with a key management system 590 that manages a tag repository and performs authorization checks before providing the necessary encryption keys for accessing the encrypted data.

For example, in accordance with examples provided herein, to access a column dataset, the client device 500 can transmit an EEK request to the key management system 590 via a communication interface 510 of the client device 500.

Instead of referencing a tag in the EEK request, the client device 500 references the dataset, column, and timestamp of the requested column dataset. The key management system 590 performs the tag verification to verify that the client user has permission to access the column dataset, generates the EEK, and provided the EEK to the client device 500, which then sends the decryption request back to the key management system 590.

As described herein, the decryption request includes the EEK, with the encrypted original key, dataset name, column name, and timestamp of the column dataset. The key management system 590 performs the necessary verifications, decrypts the original key, and optionally performs a finalize integrity check. The key management system 590 then returns the original encryption key to the client device 500 to enable the client device 500 to access the column dataset accordingly.

Figure 6:
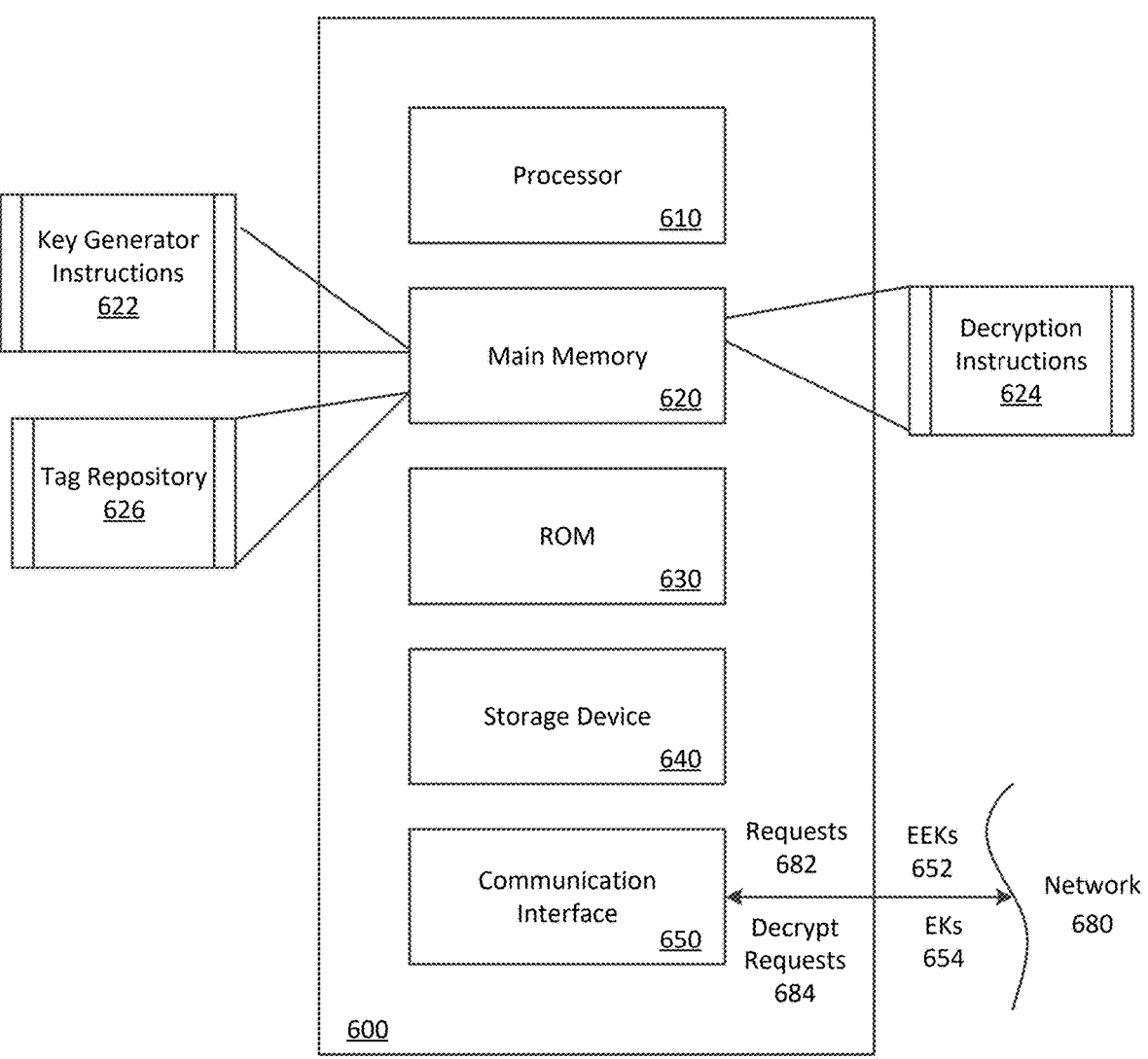
FIG. 6 is a block diagram illustrating a computer system upon which examples described herein may be implemented.

FIG. 6 is a block diagram that illustrates a computer system upon which examples described herein may be implemented. A computer system 600 can be implemented on, for example, a server or combination of servers. For example, the computer system 600 may be implemented as part of a key management service for performing column level access control. In the context of FIG. 1, the key management system 100 may be implemented using a computer system 600 such as described by FIG. 6. The key management system 100 may also be implemented using a combination of multiple computer systems as described in connection with FIG. 6.

In one implementation, the computer system 600 includes processing resources 610, a main memory 620, a read-only memory (ROM) 630, a storage device 640, and a communication interface 650. The computer system 600 includes at least one processor 610 for processing information stored in the main memory 620, such as provided by a random-access memory (RAM) or other dynamic storage device, for storing information and instructions which are executable by the processor 610. The main memory 620 also may be used for storing temporary variables or other intermediate information during execution of instructions to be executed by the processor 610. The computer system 600 may also include the ROM 630 or other static storage device for storing static information and instructions for the processor 610. A storage device 640, such as a magnetic disk or optical disk, is provided for storing information and instructions.

The communication interface 650 enables the computer system 600 to communicate with one or more networks 680 (e.g., cellular network, Wi-Fi, etc.) through use of the network link (wireless or wired). Using the network link, the computer system 600 can communicate with one or more computing devices and/or one or more servers. In accordance with examples, the computer system 600 receives client requests 682 to access column datasets. The computer system 600 executes key generator instructions to generate original encryption keys and encrypt the original encryption keys using a shared master key to generate EEKs. The computer system 600 further stores a tag repository 626 to verify that client users have permission to access requested datasets. The computer system 600 transmits the EEKs 652 to the client devices based on the client requests 682, and receives decryption requests 684 accordingly. The computer system 600 may further execute decryption instructions 624 to decrypt the EEK and provide original encryption keys 654 back to the client devices to facilitate access to authorized column datasets.

By way of example, the instructions and data stored in the memory 620 can be executed by the processor 610 to implement an example key management system 100 of FIG. 1. The processor 610 is configured with software and/or other logic to perform one or more processes, steps and other functions described with implementations, such as described by FIGS. 1-4, and elsewhere in the present application.

Examples described herein are related to the use of the computer system 600 for implementing the techniques described herein. According to one example, those techniques are performed by the computer system 600 in response to the processor 610 executing one or more sequences of one or more instructions contained in the main memory 620. Such instructions may be read into the main memory 620 from another machine-readable medium, such as the storage device 640. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A key management system implementing column-level access control, comprising:

a tag repository storing information associating one or more policy tags with each column dataset of one or more column datasets;

a network communication interface to communicate over one or more networks;

one or more processors; and a memory storing instructions that, when executed by the one or more processors, cause the key management system to:

receive, from a client device over the one or more networks, a client request for an encrypted encryption key (EEK) to access one or more column datasets, the client request including a column name for each of the one or more column datasets;

based in part on the column name for each of the one or more column datasets of the client request, perform a lookup in the tag repository to identify one or more policy tags associated with each column name of the client request;

based on the one or more identified policy tags, determine whether the client device is authorized to access each of the one or more column datasets corresponding to each column name of the client request;

based on determining that the client device is authorized to access the one or more column datasets, (i) generate or obtain an original encryption key, and (ii) generate the encrypted encryption key (EEK) by using each of (a) a master key shared between the key management system and the client device, (b) the original encryption key, and (c) the column name for each of the one or more column datasets; and provide the EEK to the client device over the one or more networks.

2. The key management system of claim 1, wherein the client request further includes (i) a dataset name for a data table that includes the one or more column datasets and (ii) a timestamp for at least one of the one or more column datasets, and wherein the instructions, when executed, cause the key management system to perform the lookup in the tag repository using the dataset name and timestamp for at least one of the one or more column datasets.

3. The key management system of claim 2, wherein the instructions, when executed, cause the key management system to generate the EEK using at least the dataset name and the timestamp of at least one of the one or more column datasets.

4. The key management system of claim 3, wherein the instructions, when executed, further cause the key management system to:

subsequent to providing the EEK to the client device, receive, over the one or more networks, a decrypt EEK request from the client device, the decrypt EEK request including data corresponding to the dataset name, the column name, the timestamp, and the EEK;

query the tag repository to identify the one or more policy tags associated with the one or more column datasets and determine whether the client device is authorized to access the one or more column datasets; and based on determining that the client device is authorized to access the one or more column datasets, decrypt the EEK using the shared master key and provide, over the one or more networks, the original encryption key to the client device to enable access to the one or more column datasets.

5. The key management system of claim 2, wherein the shared master key is a time-based physical key that is associated with a time-to-live (TTL) to facilitate data retention enforcement.

6. The key management system of claim 5, wherein the TTL of the shared master key corresponds to the timestamp of at least one of the one or more column datasets.

7. The key management system of claim 1, wherein the instructions, when executed, further cause the key management system to:

receive data corresponding to a tag change for the one or more column datasets; and configure the one or more policy tags associated with the one or more column datasets in the tag repository to implement the tag change.

8. The key management system of claim 7, wherein the tag change does not require re-encryption or a rewrite of the one or more column datasets.

9. A non-transitory computer readable medium storing instructions that, when executed by one or more processors of a computing system, cause the computing system to:

store, in a tag repository, information associating one or more policy tags with each column dataset of one or more column datasets;

receive, from a client device over one or more networks, a client request for an encrypted encryption key (EEK)

to access one or more column datasets, the client request including a column name for each of the one or more column datasets;

based in part on the column name for each of the one or more column datasets of the client request, perform a lookup in the tag repository to identify one or more policy tags associated with each column name of the client request;

based on the one or more identified policy tags, determine whether the client device is authorized to access each of the one or more column datasets corresponding to each column name of the client request;

based on determining that the client device is authorized to access the one or more column datasets, (i) generate or obtain an original encryption key, and (ii) generate the encrypted encryption key (EEK) by using each of (a) a master key shared between a key management system and the client device, (b) the original encryption key, and (c) the column name for each of the one or more column datasets; and provide the EEK to the client device over the one or more networks.

10. The non-transitory computer readable medium of claim 9, wherein the client request further includes (i) a dataset name for a data table that includes the one or more column datasets and (ii) a timestamp for at least one of the one or more column datasets, and wherein the instructions, when executed, cause the computing system to perform the lookup in the tag repository using the dataset name and timestamp of at least one of the one or more column datasets.

11. The non-transitory computer readable medium of claim 10, wherein the instructions, when executed, cause the computing system to generate the EEK using at least the dataset name and the timestamp of at least one of the one or more column datasets.

12. The non-transitory computer readable medium of claim 11, wherein the instructions, when executed, further cause the computing system to:

subsequent to providing the EEK to the client device, receive, over the one or more networks, a decrypt EEK request from the client device, the decrypt EEK request including data corresponding to the dataset name, the column name, the timestamp, and the EEK;

query the tag repository to identify the one or more policy tags associated with the one or more column datasets and determine whether the client device is authorized to access the one or more column datasets; and based on determining that the client device is authorized to access the one or more column datasets, decrypt the EEK using the shared master key and provide, over the one or more networks, the original encryption key to the client device to enable access to the one or more column datasets.

13. The non-transitory computer readable medium of claim 10, wherein the shared master key is a time-based physical key that is associated with a time-to-live (TTL) to facilitate data retention enforcement.

14. The non-transitory computer readable medium of claim 13, wherein the TTL of the shared master key corresponds to the timestamp of the one or more column datasets.

15. The non-transitory computer readable medium of claim 9, wherein the instructions, when executed, further cause the computing system to:

receive data corresponding to a tag change for the one or more column datasets; and configure the one or more policy tags associated with the one or more column datasets in the tag repository to implement the tag change.

16. The non-transitory computer readable medium of claim 15, wherein the tag change does not require re-encryption or a rewrite of the one or more column datasets.

17. A computer-implemented method of managing column-level access control, the method being performed by one or more processors and comprising:

storing, in a tag repository, information associating one or more policy tags with each column dataset of one or more column datasets;

receiving, from a client device over one or more networks, a client request for an encrypted encryption key (EEK) to access one or more column datasets, the client request including a column name for each of the one or more column datasets;

based in part on the column name for each of the one or more column datasets of the client request, performing a lookup in the tag repository to identify one or more policy tags associated with each column name of the client request;

based on the one or more identified policy tags, determine whether the client device is authorized to access each of the one or more column datasets corresponding to each column name of the client request;

based on determining that the client device is authorized to access the one or more column datasets, (i) generating or obtaining an original encryption key, and (ii) generating the encrypted encryption key (EEK) by using each of (a) a master key shared between a key management system and the client device, (b) the original encryption key, and (c) the column name for each of the one or more column datasets; and providing the EEK to the client device over the one or more networks.

18. The method of claim 17, wherein the client request further includes (i) a dataset name for a data table that includes the one or more column datasets and (ii) a timestamp for at least one of the one or more column datasets, and wherein the instructions, when executed, cause the one or more processors to perform the lookup in the tag repository using the dataset name and timestamp of at least one of the one or more column datasets.

19. The method of claim 18, wherein the one or more processors generate the EEK using at least the dataset name and the timestamp of at least one of the one or more column datasets.

20. The method of claim 19, further comprising:

subsequent to providing the EEK to the client device, receiving, over the one or more networks, a decrypt EEK request from the client device, the decrypt EEK request including data corresponding to the dataset name, the column name, the timestamp, and the EEK;

querying the tag repository to identify the one or more policy tags associated with the one or more column datasets and determine whether the client device is authorized to access the one or more column datasets; and based on determining that the client device is authorized to access the one or more column datasets, decrypting the EEK using the shared master key and provide, over the one or more networks, the original encryption key to the client device to enable access to the one or more column datasets.

* * * * *